United States Patent
Sugimori et al.

(10) Patent No.: US 12,159,082 B2
(45) Date of Patent: Dec. 3, 2024

(54) ELECTRONIC APPARATUS AND METHOD FOR CONTROLLING OPERATION OF THE SAME

(71) Applicant: SONY SEMICONDUCTOR SOLUTIONS CORPORATION, Kanagawa (JP)

(72) Inventors: Yasufumi Sugimori, Kanagawa (JP); Takanobu Kobashiri, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/002,893

(22) PCT Filed: May 21, 2021

(86) PCT No.: PCT/JP2021/019362
§ 371 (c)(1),
(2) Date: Dec. 22, 2022

(87) PCT Pub. No.: WO2022/004187
PCT Pub. Date: Jan. 6, 2022

(65) Prior Publication Data
US 2023/0259324 A1    Aug. 17, 2023

(30) Foreign Application Priority Data
Jun. 30, 2020    (JP) .................................. 2020-113177

(51) Int. Cl.
*G06F 3/16*    (2006.01)
*G06F 3/041*    (2006.01)
*H04R 1/10*    (2006.01)

(52) U.S. Cl.
CPC ............ *G06F 3/165* (2013.01); *G06F 3/0416* (2013.01); *H04R 1/1041* (2013.01); *H04R 2420/07* (2013.01)

(58) Field of Classification Search
CPC ..... G06F 3/165; G06F 3/0416; H04R 1/1041; H04R 2420/07
(Continued)

(56) References Cited

U.S. PATENT DOCUMENTS 9,483,129 B1 * 11/2016 Holsen .................. G06F 3/0443
2015/0054776 A1 * 2/2015 Reitan .................. G06F 3/0443
345/174

(Continued)

FOREIGN PATENT DOCUMENTS

JP    2006-524003 A    10/2006
JP    2009-032258 A    2/2009
(Continued)

OTHER PUBLICATIONS

International Search Report and Written Opinion of PCT Application No. PCT/JP2021/019362, issued on Jun. 29, 2021, 09 pages of ISRWO.

*Primary Examiner* — Kwin Xie
(74) *Attorney, Agent, or Firm* — CHIP LAW GROUP (57) ABSTRACT

The present invention is an electronic apparatus including a processor module including an operation mode in which a predetermined control program is executed by receiving supply of an operation clock, and a stop mode that is stopped without receiving supply of the operation clock, a user interface unit that detects a touch operation by a user and outputs an operation signal sequence corresponding to the detected touch operation, and a command detection unit that detects a command corresponding to the touch operation on the basis of the output operation signal sequence. The command detection unit performs, in a case of having (Continued)

detected the command in a case where the processor module is in the stop mode, control so that the processor module shifts from the stop mode to the operation mode.

13 Claims, 8 Drawing Sheets

(58) Field of Classification Search
USPC .................................................. 345/173–174
See application file for complete search history.

(56) References Cited

U.S. PATENT DOCUMENTS

2018/0074843 A1* 3/2018 Smith ................. G06F 9/45558
2019/0366204 A1* 12/2019 Barney ................. A63F 13/219

FOREIGN PATENT DOCUMENTS

| JP | 2013-229029 A | 11/2013 | | |
|----|---------------|---------|---|---|
| JP | 2014-241049 A | 12/2014 | | |
| WO | WO-2020125839 A1 * | 6/2020 | ............. | G06F 21/31 |

* cited by examiner

FIG. 8 ic apparatus, and more particularly to a compact electronic apparatus including a touch-type user interface and a method for controlling operation of the electronic apparatus.

ELECTRONIC APPARATUS AND METHOD FOR CONTROLLING OPERATION OF THE SAME

CROSS REFERENCE TO RELATED APPLICATIONS

This application is a U.S. National Phase of International Patent Application No. PCT/JP2021/019362 filed on May 21, 2021, which claims priority benefit of Japanese Patent Application No. JP 2020-113177 filed in the Japan Patent Office on Jun. 30, 2020. Each of the above-referenced applications is hereby incorporated herein by reference in its entirety.

TECHNICAL FIELD

The present invention relates to an electronic apparatus, and more particularly to a compact electronic apparatus including a touch-type user interface and a method for controlling operation of the electronic apparatus.

BACKGROUND ART

In recent years, true wireless earphones as a representative example of compact electronic apparatuses have been rapidly spreading. The true wireless earphones are wireless earphones conforming to the Bluetooth (registered trademark) communication standards in which left and right earphone pieces are completely independent. Because each of the true wireless earphones is built into an extremely small housing, there are numerous design constraints. For example, in view of fit and design of main bodies of true wireless earphones, there is a demand for a user interface considering operability while excluding as many physical switch operation mechanisms as possible. Furthermore, while a battery built in each of the main bodies has a small capacity, there is an extremely strong demand for power saving and low power consumption for ensuring a long battery life.

For example, Patent Document 1 below discloses, as a technique for power saving of an apparatus, a technique for, in an apparatus including a standby mode and a power-saving mode achieving power consumption lower than power consumption in the standby mode, stopping, when the apparatus is in the power-saving mode, operation of a coordinate detection circuit that detects information of a position on a touch panel, and, in response to a specific switch operation, shifting to the standby mode to activate the coordinate detection circuit to set an operation unit to be operable.

CITATION LIST

Patent Document

Patent Document 1: Japanese Patent Application Laid-Open No. 2009-032258

SUMMARY OF THE INVENTION

Problems to be Solved by the Invention

Patent Document 1 described above adopts a configuration in which, while power saving is achieved by stopping a touch sensor function of the touch panel, a main control means that integrally controls the entire apparatus operates in the power-saving mode. Therefore, a processor module such as a CPU that constitutes the main control means still needs to operate consuming power.

Meanwhile, because power consumed by the processor module accounts for relatively large portion of power consumption of a compact electronic apparatus such as a true wireless earphone, it is not realistic to apply technology of Patent Document 1 in which a processor module is always operated even in a power-saving mode.

Therefore, an object of the present disclosure is to provide new power-saving, low-power technology adapted to a compact electronic apparatus such as a true wireless earphone.

More specifically, an object of the present technology is to provide a compact electronic apparatus achieving further power saving and low power consumption in a standby state or in a state where an original operation is stopped, and a method for controlling operation of the electronic apparatus.

Furthermore, an object of the present technology is to provide a compact electronic apparatus capable of, while achieving power saving and low power consumption, efficiently activating a CPU of which operation has stopped, and a method for controlling operation of the electronic apparatus.

Moreover, an object of the present technology is to provide a compact electronic apparatus capable of effectively receiving input by a touch operation, which is performed by a user before the CPU operates, and a method for controlling operation of the electronic apparatus.

Solutions to Problems

The present technology for solving the above-described problems includes the following matters specifying the invention or technical features.

The present technology according to one aspect is an electronic apparatus including a processor module including an operation mode in which a predetermined control program is executed by receiving supply of a predetermined operation clock, and a stop mode that is stopped without receiving supply of the predetermined operation clock, a user interface unit that detects a touch operation by a user and outputs an operation signal sequence corresponding to the detected touch operation, and a command detection unit that detects a command corresponding to the touch operation on the basis of the output operation signal sequence. The command detection unit is configured to perform, in a case of having detected the command in a case where the processor module is in the stop mode, control so that the processor module shifts from the stop mode to the operation mode.

Furthermore, the present technology according to another aspect is an electronic apparatus including a first device and a second device. Each of the first device and the second device includes a processor module including an operation mode in which a predetermined control program is executed by receiving supply of the predetermined operation clock, and a stop mode that is stopped without receiving supply of the predetermined operation clock, a user interface unit that detects a touch operation by a user and outputs an operation signal sequence corresponding to the detected touch operation, and a command detection unit that detects a command corresponding to the touch operation on the basis of the output operation signal sequence. Each of the command detection units performs, in a case of having detected the command in a case where the processor module is in the stop mode, control so that the processor module shifts from the stop mode to the operation mode. Furthermore, each of the processor modules transmits, in the operation mode, the detected command to an external device. Moreover, each of the first device and the second device operates under control of the external device according to a combination of the operation signal sequence from each of the user interface units.

Furthermore, the present technology according to another aspect is a method for controlling operation of an electronic apparatus. The method includes execution of, in a case where a processor module is in a stop mode in which the processor module stops without receiving supply of a predetermined operation clock, receiving an operation signal sequence corresponding to a touch operation by a user, the touch operation being detected by a user interface unit, detecting a command corresponding to the touch operation on the basis of the received operation signal sequence, and, in a case where the command is detected, performing control so that the processor module shifts from the stop mode to an operation mode in which a predetermined control program is executed by receiving supply of a predetermined operation clock.

Note that, in the present specification and the like, a means does not simply mean a physical means, and includes a case where a function of the means is implemented by software. Furthermore, a function of one means may be implemented by two or more physical means, or functions of two or more means may be implemented by one physical means. Furthermore, a "system" refers to a logical assembly of a plurality of apparatuses (or functional modules that implement specific functions), and each of the apparatuses or functional modules may be or may not be in a single housing.

Other technical features, objects, effects, or advantages of the present invention will be clarified by the following embodiments described with reference to the accompanying drawings. The effects described herein are only examples, and the effects of the present specification are not limited to these effects. Additional effects may also be obtained.

MODE FOR CARRYING OUT THE INVENTION

Hereinafter, an embodiment of the present technology will be described with reference to the drawings. However, the embodiments described below are merely an example, and various modifications and applications of techniques not explicitly described below are not intended to be excluded. The present technology can be implemented by various modifications (for example, combination of each embodiment, or the like) within the scope thereof. Furthermore, in the following description of the drawings, the same or similar parts are denoted by the same or similar reference signs. The drawings are merely schematic representations, and dimensions and ratios of the dimensions therein or the like do not necessarily match the actual ones. Parts having different dimensional relations or ratios different between the drawings may be included.

First Embodiment

Figure 1:
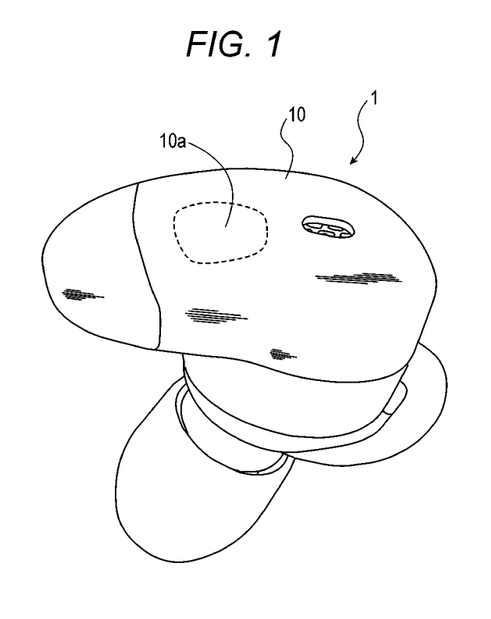
FIG. 1 is a diagram illustrating an example of an external configuration of an electronic apparatus according to an embodiment of the present technology.

FIG. 1 is a diagram illustrating an example of an external configuration of a wireless device according to an embodiment of the present technology. An electronic apparatus 1 according to the present embodiment is typically a compact electronic apparatus that operates in response to a touch operation by a user, and a true wireless earphone is an example of the compact electronic apparatus. In the present disclosure, the electronic apparatus 1 will be described as a true wireless earphone conforming to the Bluetooth (registered trademark) communication standards. In general, a true wireless earphone is a slave device that functions in cooperation with a master device such as a smartphone. However, the electronic apparatus 1 of the present embodiment is not limited to such an apparatus, and may function alone.

As illustrated in the figure, an exterior of the electronic apparatus 1 is substantially defined by an earpiece-like housing 10 molded to adapt to a shape of an outer ear of a human. In the figure, only one of a pair of earpieces is illustrated. Furthermore, although not illustrated, a power supply and a control LSI chip are housed inside the housing 10. A part 10a of a surface of the housing 10 is configured to function as a touch sensor sensitive to a touch operation by the user. The user can give a command to a master-side smartphone via the electronic apparatus 1 by performing various touch operations on the surface 10a of the housing 10. In the present disclosure, the touch operation may include a "tap operation" (regardless of a single tap or more) in which a finger of the user is in contact for a short time, a "long-press operation" in which the finger of the user is in contact for a long time, a "flick operation" in which the finger comes into contact and then moves, and/or a "3D touch operation" that is operation as if the finger strongly presses the surface 10a of the housing 10. For example, in a case where the electronic apparatus 1 as a true wireless earphone is paired with a smartphone and operates in cooperation with the smartphone, a single-tap operation may be a play/pause command with respect to a music playback application being executed on the smartphone. Furthermore, a double-tap operation may be a cue command for a next song, and a triple-tap operation may be a cue command for a previous song or a song being played. Furthermore, a combination of a single-tap operation and a long-press operation may be a fast-forward command for a song, and a combination of a double-tap operation and a long-press operation may be a fast-rewind command for a song.

Figure 2:
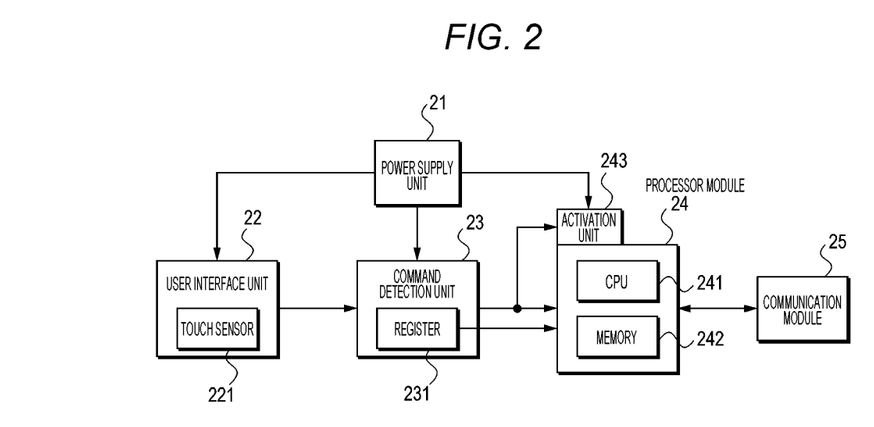
FIG. 2 is a block diagram describing an example of a configuration of the electronic apparatus according to an embodiment of the present technology.

FIG. 2 is a block diagram illustrating an example of a configuration of the electronic apparatus according to an embodiment of the present technology. As illustrated in the figure, the electronic apparatus 1 of the present embodiment includes, for example, a power supply unit 21, a user interface unit 22, a command detection unit 23, a processor module 24, and a communication module 25. For example, the command detection unit 23, the processor module 24, and the communication module 25 may be integrally configured as the control LSI chip.

The power supply unit 21 supplies necessary power to each component in the electronic apparatus 1. A power source for the power supply unit 21 is, for example, a secondary battery such as a lithium ion battery, but is not limited thereto. The power supply unit 21 may include, for example, a wireless power feed unit (not illustrated) that enables filling by wireless power feeding from outside.

The user interface unit 22 detects operation (touch operation) by the finger of the user, or the like coming into contact with a housing surface 10a. The user interface unit 22 includes, for example, a touch sensor 211 of capacitive or pressure sensitive. The user interface unit 22 outputs a sequence of a signal corresponding to the touch operation (hereinafter referred to as an "operation signal") detected by the touch sensor 221. The operation signal sequence includes, for example, a value indicating a state where there is no touch operation on the housing 10 (for example, L level or 0 level), and a value indicating a state where there is a touch operation on the housing 10 (for example, H level or 1 level). Although the user interface unit 22 is configured to output continuous H-level signal sequences while a finger of a user is in contact with the housing 10 in the present example, not limited thereto, the user interface unit 22 may be configured to continuously output pulsed signal sequences corresponding to a predetermined operation clock, for example. Furthermore, although the user interface unit 22 is configured to detect a physical contact of the finger of the user, or the like in the present disclosure, not limited thereto, the user interface unit 22 may be configured to detect, for example, a state where the finger is in proximity. The user interface unit 22 is configured to operate by receiving power supply from the power supply unit 21, also in a stop mode as described later.

The command detection unit 23 receives the operation signal sequence output from the user interface unit 22, and detects a command for the processor module 24 on the basis of the received operation signal sequence. Furthermore, the command detection unit 23 acquires or calculates times of and the number of times of touch operations on the basis of the received operation signal sequence, writes the times of and the number of times of the touch operations to a register 231 at a predetermined timing, and holds the times of and the number of times of the touch operations in a register 231. The register 231 is configured to be referable by the processor module 24. Typically, the command detection unit 23 may be configured by hardware that does not include a highly functional arithmetic circuit such as a CPU capable of executing a program, so as to keep power consumption as low as possible. The command detection unit 23 is configured to operate by receiving power supply from the power supply unit 21, also in a stop mode as described later.

In a case where an L level continues for a predetermined time after an H level in the received operation signal sequence, the command detection unit 23 recognizes that some command is included in a sequence up to that time point. That is, the command detection unit 23 detects the command in the operation signal sequence by detecting a breakpoint in a touch operation according to a length of duration of a no-signal state in the operation signal sequence. In a case of having judged that a command is detected, the command detection unit 23 outputs a command detection signal to the processor module 24.

The processor module 24 integrally controls operation of the electronic apparatus 1. The processor module 24 may be configured to include, for example, a CPU 241 and a memory 242 utilized therefor. The memory 242 stores, for example, a control program and various data. In the present disclosure, processor module 24 includes an operation mode in which a predetermined control program or the like is executed in response to supply of a predetermined operation clock from a clock circuit (not illustrated), and a stop mode in which the supply of the predetermined operation clock is stopped to stop execution of all programs. The processor module 24 shifts from the operation mode to the stop mode in a case where, for example, the user turns off the power supply with a predetermined touch operation, or in a case where there is no touch operation for a predetermined time. Furthermore, as will be described later, the processor module 24 includes an activation unit 243 that performs, in the stop mode, by being triggered by an input (interrupt) of a predetermined signal, control to start supply of a predetermined operation clock to cause the processor module 24 to shift to the operation mode. Although the activation unit 243 may include, for example, a peripheral circuit (for example, a chipset) of the CPU 241, not limited thereto, the activation unit 243 may include an internal circuit of the CPU 241 connected to a specific port of the CPU 241. Note that, although, in the present disclosure, the stop mode is described as a state where supply of the predetermined operation clock is stopped, not limited thereto, the stop mode may include, for example, a state where frequency of the operation clock is lower than in the normal time, or a state where power supply is stopped. Thus, by the processor module 24 being in the stop mode, power consumption can be reduced.

For example, in the operation mode, the processor module 24 executes the control program to implement a predetermined function in response to execution of the control program. That is, upon receiving, in the operation mode, the command detection signal from the command detection unit 23, the processor module 24 immediately refers to the register 231, fetches (acquires) content held in the register 231, and transmits, to the master device via the communication module 25, a command obtained by executing command interpretation processing. In contrast, in a case where the processor module 24 is in the stop mode, only the activation unit 243 can receive the command detection signal. Upon detecting the command detection signal, the activation unit 243 controls the processor module 24 to start the supply of the predetermined operation clock, activates the CPU 241, and thereby causes the processor module 24 to shift to the operation mode. With this arrangement, the processor module 24 executes command interpretation processing with reference to the register 231, and transmits the interpreted command to the smartphone via the communication module 25. When transmitting the command to the smartphone, the processor module 24 may add time information to the command, or include the time information in the command, for example.

With another device, which is a master device such as a smartphone for example, the communication module 25 performs wireless communication conforming to the Bluetooth (registered trademark) standards. Although the communication module 25 is configured separately from the processor module 24 in the present disclosure, the communication module 25 may be configured as a part of a chipset of the processor module 24.

Note that, although not illustrated, the electric apparatus 1 may include a real-time clock (RTC) circuit in which a clock function is implemented. The RTC circuit operates with a backup power supply, separately from the power supply of the power supply unit 21.

Figure 3:
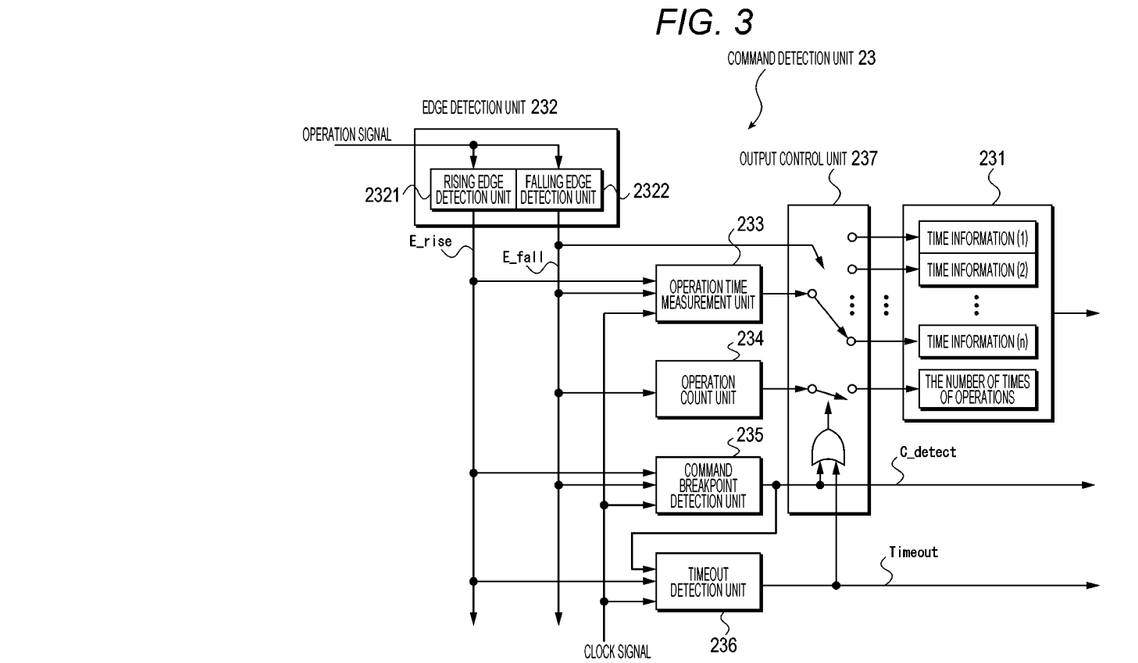
FIG. 3 is a block diagram illustrating an example of a functional configuration of a command detection unit in the electronic apparatus according to an embodiment of the present technology.

FIG. 3 is a block diagram illustrating an example of a functional configuration of the command detection unit in the wireless device according to an embodiment of the present technology. As illustrated in the figure, the command detection unit 23 includes, for example, the register 231, an edge detection unit 232, an operation time measurement unit 233, an operation count unit 234, a command breakpoint detection unit 235, a timeout detection unit 236, and an output control unit 237.

The edge detection unit 232 includes, for example, a rising edge detection unit 2321 that detects a rising (from the L level to the H level) edge of a signal in an operation signal sequence, and a falling edge detection unit 2322 that detects a falling (from the H level to the L level) edge of the signal edge. Upon detecting a rise of an operation signal, the rising edge detection unit 2321 outputs a rising edge detection signal E_riseE_rise, whereas upon detecting a fall of the operation signal, the falling edge detection unit 2322 outputs a falling edge detection signal E_fall.

The operation time measurement unit 233 measures a time of touch operation by the user, and holds the measured time as a time of the touch operation. The held time of the touch operation is read in response to detection of a fall of the operation signal. That is, upon receiving the rising edge detection signal E_rise from the rising edge detection unit 2321, triggered by this, the operation time measurement unit 233 measures, according to an unillustrated clock signal, an elapsed time until receiving the falling edge detection signal E_fall from the falling edge detection unit 2322. Note that, in a case where a tap operation by the user is too early (that is, in a case where contact time is extremely short), time of the touch operation cannot be correctly measured although the touch operation is performed. Therefore, a delay unit (not illustrated) that delays the rising edge detection signal E_rise may be provided.

Each time receiving the falling edge detection signal E_fall from the falling edge detection unit 2322, the operation count unit 234 increments a count value and temporarily holds the count value. The held count value is output triggered by the command breakpoint detection unit 235, which will be described later, detecting a command breakpoint, or by a timeout. Furthermore, when the count value is read, the operation count unit 234 resets the count value.

The command breakpoint detection unit 235 detects a breakpoint of a command in an operation signal sequence. That is, upon receiving the falling edge detection signal E_fall from the falling edge detection unit 2322, triggered by this, the command breakpoint detection unit 235 measures, according to the unillustrated clock signal, a time during which the state of the L level elapses. That is, the measurement by the command breakpoint detection unit 235 is temporarily reset by receiving the rising edge detection signal E_rise from the rising edge detection unit 2321. In a case of having judged that the measured elapsed time exceeds a predetermined threshold value, the command breakpoint detection unit 235 determines that command input by the user performing the touch operation has been completed, and outputs a command detection signal C_detect. Meanwhile, in a case of having received the rising edge detection signal E_rise before the measured elapsed time exceeds the predetermined threshold value, the command breakpoint detection unit 235 judges that the command input has not been completed, and resets the measurement time. Thus, in the present example, the command breakpoint detection unit 235 detects a breakpoint of a command by judging whether or not a predetermined time has elapsed from a last fall of an operation signal. For example, in a case where touch operation by the user is a combination of some operation actions such as a double-tap operation, when a next tap is performed immediately after the tapping, the command breakpoint detection unit 235 judges that the touch operation by the user is still continuing.

The command breakpoint detection unit 235 outputs the command detection signal C_detect to the timeout detection unit 236 and the output control unit 237, and also to the processor module 24. Note that, upon receiving, in a normal operation mode, the command detection signal C_detect, the processor module 24 immediately refers to the register 231, fetches content held in the register 231, executes command interpretation processing, and transmits the interpreted command to the smartphone via the communication module 25. Meanwhile, in a case where the processor module 24 is in the stop mode, the activation unit 243 receives the command detection signal C_detect, controls the processor module 24 to start the supply of the predetermined operation clock, activates the CPU 241, and thereby causes the processor module 24 to shift to the operation mode.

The timeout detection unit 236 monitors whether or not one touch operation (For example, a double-tap operation is one touch operation.) has been performed within a predetermined valid operation time, and, in a case where the predetermined valid operation time has elapsed, outputs a timeout signal Timeout. That is, upon receiving a first rising edge detection signal E_rise from the rising edge detection unit 2321, triggered by this, the timeout detection unit 236 measures the elapsed time according to the unillustrated clock signal. In a case of judging that the elapsed time has exceeded a predetermined threshold value, the timeout detection unit 236 outputs a timeout signal Timeout. Furthermore, upon receiving the command detection signal C_detect from the command breakpoint detection unit 235, the timeout detection unit 236 resets the measurement time. The timeout signal Timeout is output to the output control unit 237 and is also output to the processor module 24. Note that, upon receiving the timeout signal Timeout in the normal operation mode, the processor module 24 performs processing instead of the command detection signal C_detect. That is, the processor module 24 immediately refers to the register 231, fetches content held in the register 231, executes command interpretation processing, and transmits a command obtained by this to the master device via the communication module 25.

The output control unit 237 performs control so that times of touch operations measured by the operation time measurement unit 233 and the number of times of the touch operations measured by the operation count unit 234 are output to respective predetermined output destinations to the register 231 at respective predetermined timings. For example, each time receiving a rising edge detection signal E_rise from the falling edge detection unit 2322, the output control unit 237 selectively and sequentially switches the output destination of the times of the touch operations read from the operation time measurement unit 233. With this arrangement, the times of the touch operations are sequentially written in a specific storage area of the register 231. Furthermore, upon receiving the command detection signal C_detect from the command breakpoint detection unit 235, the output control unit 237 performs control so that the number of times of the touch operations read from the operation count unit 234 is output to the register 231. With this arrangement, the number of times of the touch operations is written in the specific storage area of the register 231 and updated.

Figure 4A:
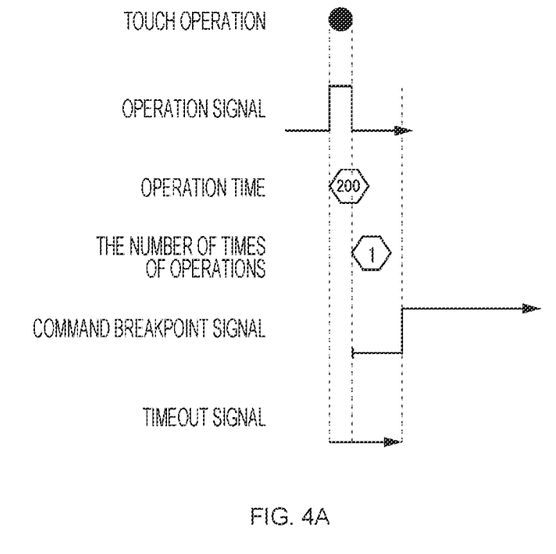
FIGS. 4A, 4B, and 4C illustrate sequences for describing examples of operation of the command detection unit in the electronic apparatus according to an embodiment of the present technology.
Figure 4B:
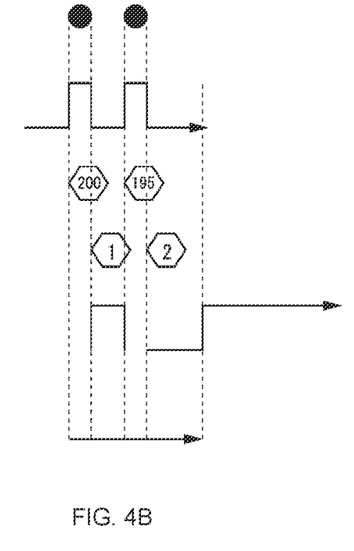
Figure 4C:
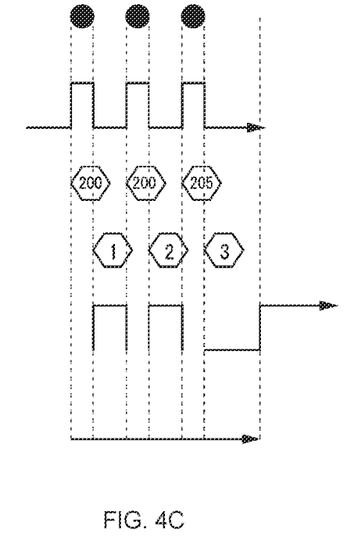

FIGS. 4A, 4B, and 4C illustrate sequences for describing examples of operation of the command detection unit in the electronic apparatus according to an embodiment of the present technology. That is, the FIG. 4A illustrates an operation example of the command detection unit 23 in a case where the user performs a single-tap operation, FIG. 4B illustrates an operation example of the command detection unit 23 in a case where the user performs a double-tap operation, and FIG. 4C illustrates an operation example of the command detection unit 23 in a case where the user performs a triple-tap operation.

As illustrated in the example of FIG. 4A, the operation time measurement unit 233 starts measurement of a time of the touch operation in response to a rising edge detection signal E_rise from the rising edge detection unit 2321, and at this time, the timeout detection unit 236 also measures a time for a timeout. Subsequently, while the operation time measurement unit 233 stops the measurement of the time in response to the falling edge detection signal E_fall, the operation count unit 234 increments a count value by one. With this arrangement, the output control unit 237 controls output such that a current measurement time (for example, 200 ms) is written in a predetermined storage area of the register 231, and controls the output such that the number of times of that (for example, one time) is written in the predetermined storage area. Then, in the present example, when a predetermined time elapses from a time point at which the command detection unit 23 receives the falling edge detection signal E_fall, the command detection unit 23 outputs a command breakpoint detection signal C_detect. Note that the timeout detection unit 236 is reset because the command breakpoint detection signal C_detect is output before the elapsed time from the first rising edge detection signal E_rise times out.

Furthermore, as illustrated in the example of FIG. 4B, the operation time measurement unit 233 starts measurement of a time of the touch operation in response to a first rising edge detection signal E_rise from the rising edge detection unit 2321, and the timeout detection unit 236 measures a time for a timeout. Subsequently, the operation time measurement unit 233 stops the measurement of the time in response to the falling edge detection signal E_fall, and the operation count unit 234 increments a count value by one. With this arrangement, the output control unit 237 controls output such that a time based on a current measurement time (for example, 200 ms) is written in a predetermined storage area of the register 231, and controls the output such that the number of times of that (for example, one time) is written in a predetermined storage area. Subsequently, the operation time measurement unit 233 starts measurement of a time of the touch operation in response to a second rising edge detection signal E_rise from the rising edge detection unit 2321. Subsequently, the operation time measurement unit 233 stops the measurement of the time in response to the falling edge detection signal E_fall, and the operation count unit 234 increments a count value by one. With this arrangement, the output control unit 237 controls output such that a time based on a current measurement time (for example, 195 ms) is written in a predetermined storage area of the register 231, and controls the output such that the number of times of that (for example, two times) is written in a predetermined storage area. Then, when a predetermined time elapses from a time point at which the command detection unit 23 receives a second falling edge detection signal E_fall, the command detection unit 23 outputs a command breakpoint detection signal C_detect.

Furthermore, a similar applies to the example of the triple-tap operation illustrated in FIG. 4C. That is, the operation time measurement unit 233 measures a time from reception of the rising edge detection signal E_rise to reception of the falling edge detection signal E_fall, and the operation count unit 234 increments a count value each time the falling edge detection signal E_fall is received. Furthermore, upon receiving the falling edge detection signal E_fall, the output control unit 237 controls output such that the times of and the number of times that are measured so far are written in a predetermined storage area of the register 231. Then, when a predetermined time elapses from a time point at which the command detection unit 23 receives a third falling edge detection signal E_fall, the command detection unit 23 outputs a command breakpoint detection signal C_detect.

Figure 5A:
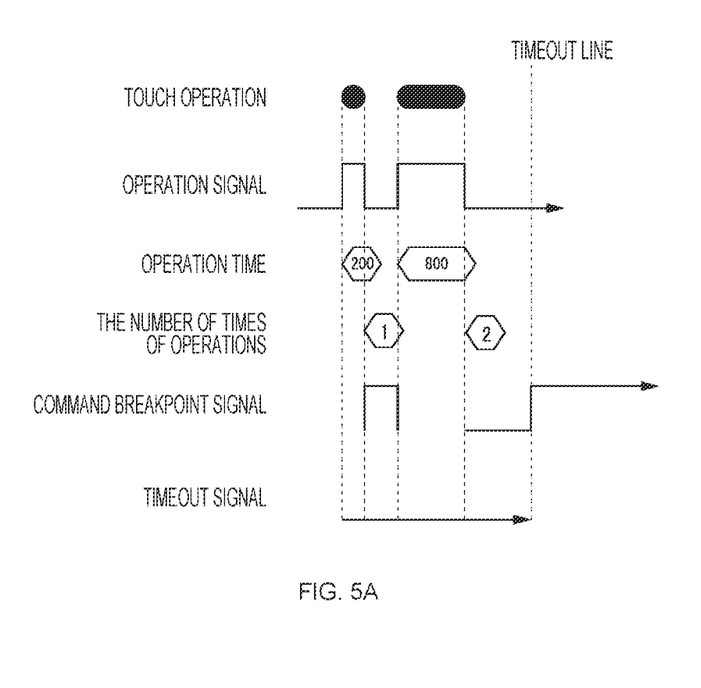
FIGS. 5A and 5B illustrate sequences for describing an examples of operation of the command detection unit in the electronic apparatus according to an embodiment of the present technology.
Figure 5B:
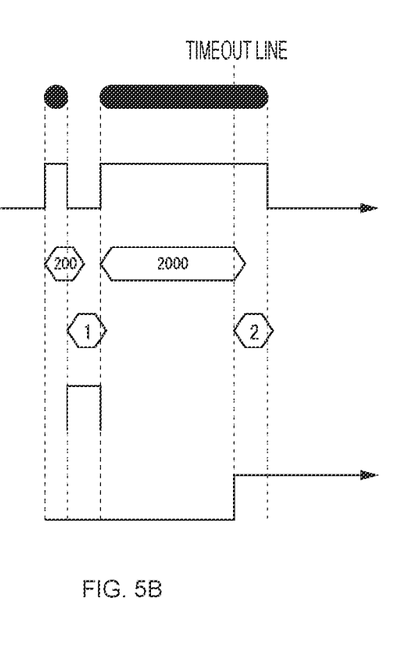

FIGS. 5A and 5B illustrate sequences for describing an examples of operation of the command detection unit in the electronic apparatus according to an embodiment of the present technology. That is, FIGS. 5A and 5B illustrate operation examples of the command detection unit 23 in a case where the user performs a long-press operation after a single-tap operation, and FIG. 5B illustrates an operation example in a case where the long-press operation times out.

The FIG. 5A is different from the example of a double-tap operation illustrated in FIG. 4B in that the second touch operation by the user is a long-press operation. Similarly, when a predetermined time elapses from a time point at which the command breakpoint detection unit 235 receives a second falling edge detection signal E_fall before the timeout, the command breakpoint detection unit 235 outputs a command breakpoint detection signal C_detect.

Meanwhile, in the example illustrated in FIG. 5A, the long-press operation by the user is performed for a long time exceeding a predetermined threshold value. Therefore, upon judging that the measurement time has exceeded a predetermined threshold value (timeout line), the timeout detection unit 236 outputs a timeout signal Timeut. With this arrangement, the output control unit 237 controls output such that the times of and the number of times that are measured so far are written in a predetermined storage area of the register 231.

Note that, although not illustrated, in a case of another touch operation by the user, for example, in a case of only a long-press operation, in a case of performing a long-press operation after a double-tap operation, and in a case of performing a long-press operation after a triple-tap operation, the command detection unit 23 operates similarly to hold an operation signal sequence in the register 231, and outputs a command detection signal C_detect or a timeout signal Timeout.

Figure 6:
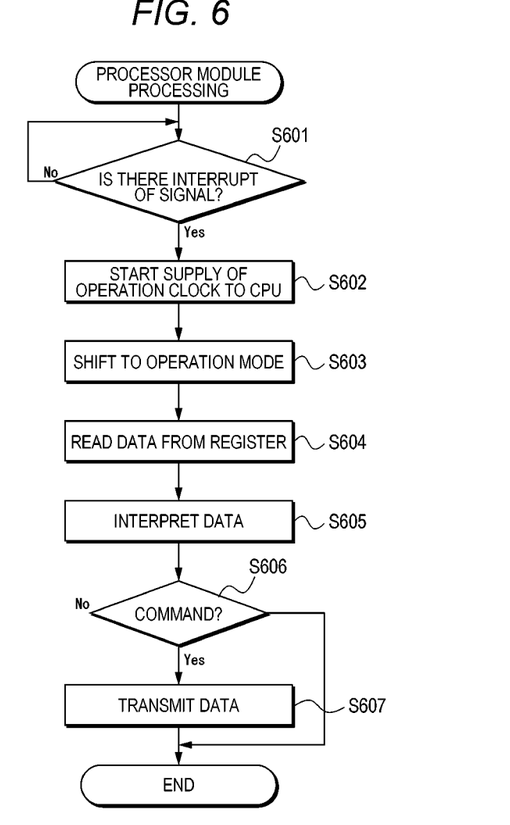
FIG. 6 is a flowchart for describing an example of operation of a processor module in the electronic apparatus according to an embodiment of the present technology.

FIG. 6 is a flowchart for describing an example of operation of a processor module in the electronic apparatus according to an embodiment of the present technology, and specifically, describes a flow of processing in a case where the processor module 24 is in the stop mode.

As illustrated in the figure, the activation unit 243 monitors whether or not there is an interrupt of the command detection signal C_detect or timeout signal Timeout from the command detection unit 23 (S601). In this state, the CPU 241 does not receive supply of the predetermined operation clock and completely stops execution of the control program, whereby the electronic apparatus 1 keeps power consumption as low as possible.

In a case of having detected an interrupt of the command detection signal C_detect or of the timeout signal Timeout (Yes in S601), the activation unit 243 performs control so that supply of the predetermined operation clock to the CPU 241 is started (S602), and in response to this, the CPU 241 performs activation processing and shifts to the operation mode (S603).

Subsequently, the CPU 241 refers to the register 231 of the command detection unit 23 and reads, from the register 231, data regarding the times of and the number of times of touch operations (S604). Next, the CPU 241 interprets the read data (S605) and judges whether or not the read data can be recognized as a predetermined command (S606). In a case where the read data has been able to be recognized as the predetermined command (Yes in S606), the CPU 241 transmits the recognized command to the master device, such as the smartphone, via the communication module 25 (S607). Thereafter, the CPU 241 remains in the operation mode and waits until a next interrupt. In contrast, in a case where the read data has not been able to be recognized as the predetermined command (No in S606), the CPU 241 performs error processing, such as resetting content of the register 231 for example, and waits until a next interrupt while remaining in the operation mode.

Note that operation of the processor module 24 in the operation mode is different from in the stop mode in that there is no processing of S602 and S603 described above, and thus description thereof will be omitted.

As described above, according to the present embodiment, the command detection unit 23 typically includes hardware not including a highly functional arithmetic circuit such as a CPU capable of executing a program, and therefore it is possible to keep power consumption low while the user is not using the electronic apparatus 1. In particular, in a case where the CPU 241 is in the stop mode, the command detection unit 23 holds, in the register 231, an operation signal sequence based on the touch operation by the user, and therefore, in a case of having shifted from the stop mode to the operation mode, the CPU 241 can immediately refer to the content of the register 231. With this arrangement, it is possible to effectively receive input by a touch operation performed by a user before the CPU 241 operates, and to utilize the command immediately after the CPU 241 starts operation.

Although the command detection unit 23 is configured to detect a command on the basis of a single-tap operation, a double-tap operation, or a long-press operation in the above-described embodiment, instead thereof or in addition thereto, the command detection unit 23 may be configured to detect a command on the basis of an operation in which the user strongly presses the surface 10a of the housing 10 with a finger (3D touch operation). As an example, the user interface unit 22 outputs an operation signal sequence only in a case where it is judged that strength of a touch operation by the user exceeds a predetermined threshold value.

Figure 8:
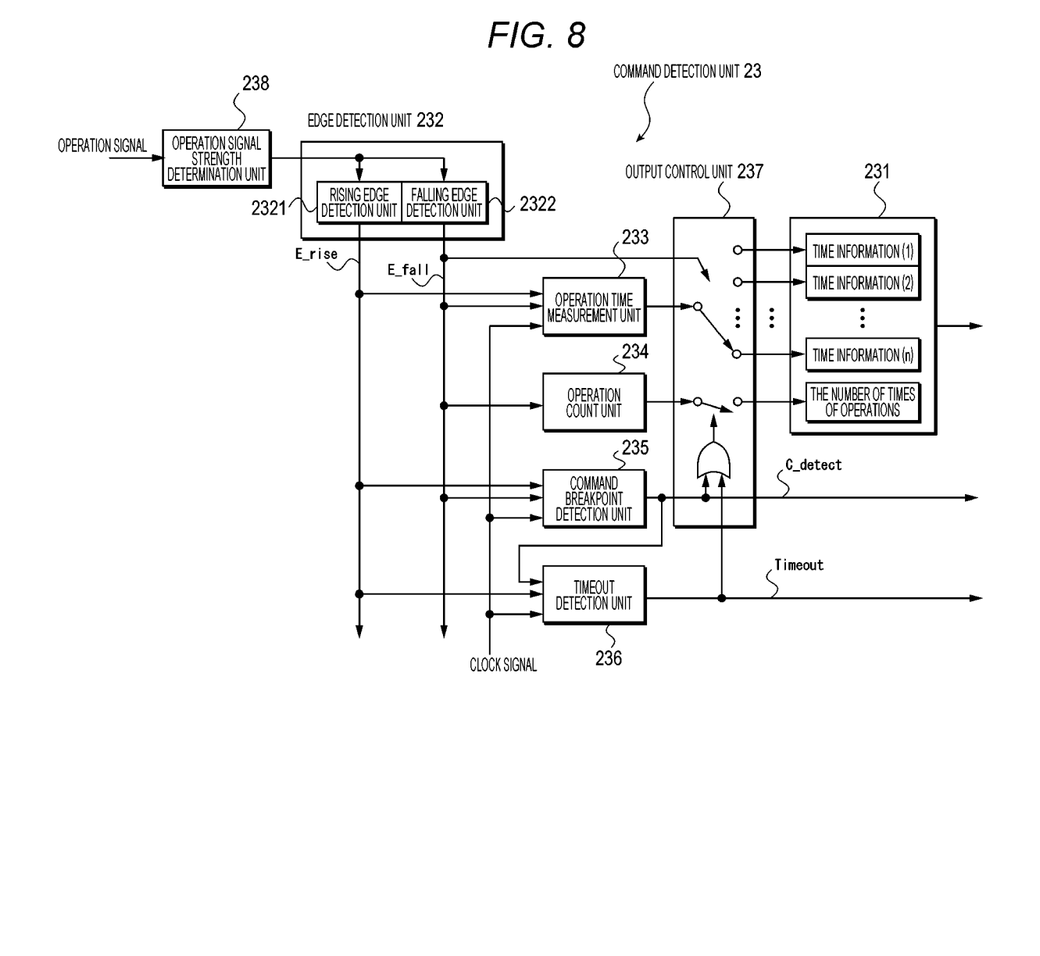
FIG. 8 is a block diagram illustrating another example of a functional configuration of the command detection unit in the electronic apparatus according to an embodiment of the present technology.

As another example, the command detection unit 23 may further include an operation signal strength determination unit 238 as illustrated in FIG. 8. The user interface unit 22 outputs an operation signal sequence having a value of a level corresponding to strength of touch operation by the user, and the operation signal strength determination unit 238 outputs the operation signal sequence to the edge detection unit 232 only in a case where strength (amplitude) of the operation signal from the user interface unit 22 exceeds a predetermined threshold value. With this arrangement, only in a case where the strength of the operation signal exceeds the predetermined threshold value, the command detection unit 23 stores, in the register 231, the times of and the number of times of touch operations based on the operation signal sequence as described above, and outputs a command breakpoint detection signal C_detect at a predetermined timing.

Furthermore, as another example, in the stop mode, the user interface unit 22 may output the operation signal sequence only in a case where the finger of the user comes into contact with a specific part of a plurality of parts on the housing surface 10a, the parts being available for touch operation. Alternatively, the command detection unit 23 may include a position detection unit (not illustrated) that detects a position operated on the basis of the operation signal sequence, and may be configured to operate according to the detected position.

As still another example, in the stop mode, the user interface unit 22 may be configured not only to detect a tap operation on the housing surface 10a but also to detect a change in a contact position on the surface 10a like a flick operation, for example. The command detection unit 23 stores, in the register 231, types of, times of, and the number of times of touch operations based on the operation signal sequence, and outputs a command breakpoint detection signal C_detect at a predetermined timing.

With this arrangement, in a case where the user erroneously touches the housing 10 for example, the command detection unit 23 can judge that the touch is an erroneous operation and avoid unnecessary activation of the CPU 241, achieving power saving.

Second Embodiment

Although an example has been described in which one earphone piece of true wireless earphones as the electronic apparatus 1 is used in the above-described embodiment, an example in which two earphone pieces are used will be described in the present embodiment.

Figure 7:
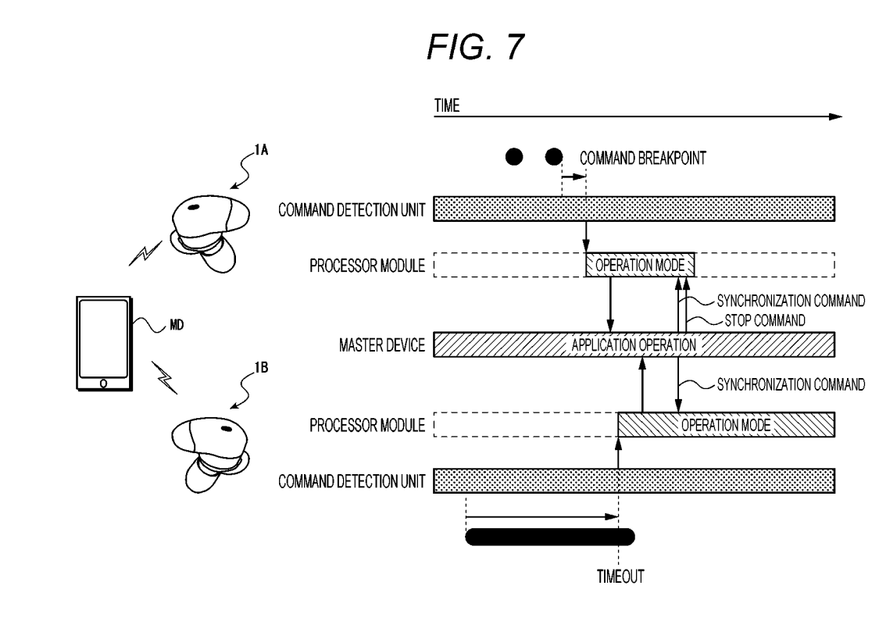
FIG. 7 is a sequence diagram for describing operation of a wireless device system according to an embodiment of the present technology.

FIG. 7 is a sequence diagram for describing operation of a wireless device system according to an embodiment of the present technology. That is, the wireless device system of the present embodiment includes an electronic apparatus 1 including a pair of first device 1A and second device 1B, and a master device MD such as a smartphone. The pair of first device 1A and second device 1B may have the same hardware/software configuration. In a case where the electronic apparatus 1 is a pair of true wireless earphones, the first device 1A is, for example, a left-side earphone piece, and the second device 1B is, for example, a right-side earphone piece. The master device MD implements an application program configured to be able to cooperate with the electronic apparatus 1 via Bluetooth (registered trademark) communication.

For example, it is assumed that both the first device 1A and the second device 1B are in a stop mode. Therefore, as described above, a processor module 24 does not receive supply of a predetermined operation clock, and a CPU 241 stops execution of a control program, whereas a user interface unit 22 and a command detection unit 23 operate by receiving minimum power supply from a power supply unit 21. In such a state, as illustrated in the figure, it is assumed that a user performs a long-press operation on a housing 10 of the second device 1B and, during the long-press operation, performs a double-tap operation on a housing 10 of the first device 1A. Hereinafter, an example will be described in which, with a combination of such a double-tap operation and a long-press touch operation, synchronization information (for example, time information) is shared between the first device 1A and the second device 1B, and a device for which the double-tap operation is performed (the first device 1A in the present example) is set to the stop mode.

First, a command detection unit 23B (Hereinafter, similarly, components in the second device 1B are denoted by "B".) of the second device 1B writes times of and the number of times in a register 231 on the basis of an operation signal sequence based on the long-press operation from a user interface unit 22B. Note that, at this time point, the command detection unit 23B has not yet output a command detection signal C_detect or a timeout signal Timeout to a processor module 24B.

During this time, a command detection unit 23A (Hereinafter, similarly, components in the first device 1A are denoted by "A".) of the first device 1A writes times of and the number of times in a register 231A on the basis of an operation signal sequence based on the double-tap operation from a user interface unit 22A, detects a command, and outputs a command detection signal C_detect to a processor module 24A. The processor module 24A of the first device 1A starts supply of the predetermined operation clock in response to an interrupt of the command detection signal C_detect and shifts to an operation mode. The processor module 24 that has shifted to the operation mode refers to the register 231, acquires a command corresponding to the double-tap operation, and transmits the command to the master device MD via a communication module 25.

The master device MD executes the application program under control of a processor (not illustrated). Upon receiving the command from the first device 1A, the master device MD waits until receiving a command from the second device 1B.

Meanwhile, the command detection unit 23B of the second device 1B outputs a timeout signal Timeout to the processor module 24B because time from start of the long-press operation has exceeded a predetermined threshold value. In response to this, the processor module 24B transmits a command corresponding to the long-press operation to the master device MD.

Upon receiving the command from the second device 1B, the master device MD interprets the command. Upon judging that, as a result of the interpretation, the command is a command corresponding to the long-press operation, the master device MD, with a combination with the command corresponding to the previously received double-tap operation, transmits, to the first device 1A and the second device 1B, a synchronization command that synchronizes time information between the devices, and transmits, to the first device 1A, a stop command for shifting one device to the stop mode.

Upon receiving the synchronization command from the master device MD, the first device 1A and the second device 1B update time information on own RTC circuits according to the time information included in the synchronization command. With this arrangement, the time information of the first device 1A and the time information of the second device 1B are synchronized. Moreover, upon receiving the stop command from the master device MD, the first device shifts from the operation mode to the stop mode, stops execution of the control program, and stops supply of predetermined clock operation. With this arrangement, while the user can use only the second device 1B, power consumption in the first device 1A can be kept low.

Each of the above-described embodiments is an example for describing the present technology, and is not intended to limit the present technology only to these embodiments. The present technology can be implemented in various forms without departing from the gist thereof.

For example, in the methods disclosed herein, steps, operations, or functions may be implemented in parallel or in a different order as long as results of such implementation are consistent. The described steps, operations, and functions are provided merely as examples, and some of the steps, operations, and functions may be omitted without departing from the gist of the invention or may be combined and integrated, or another step, operation, or function may be added.

For example, in the above-described embodiments, there has been described an example of a control module of an electronic apparatus 1, the control module being configured such that a processor module 24 shifts to a stop mode in response to supply of a predetermined operation clock to a CPU 241 being stopped, but the present invention is not limited thereto. For example, the control module may be configured such that frequency of the operation clock in the stop mode is kept lower than in a normal operation. Alternatively, the control module may be configured such that power supply from a power supply unit 12 is stopped in the stop mode. In this case, upon detecting an interrupt of a command detection signal C_detect or a timeout signal Timeout, an activation unit 243 starts power supply from the power supply unit 12 and shifts the CPU 241 to the operation mode. With this arrangement, similarly to the above-described embodiments, it is possible to keep power consumption low while a user is not using the electronic apparatus 1.

Furthermore, among the various embodiments disclosed herein, a specific feature (technical matter) in one embodiment can be, with appropriate improvement, added to another embodiment or replaced with a specific feature in the another embodiment, and such forms are also included in the gist of the present technology.

Furthermore, the present technology may include the following technical matters.

(1)
An electronic apparatus including
a processor module including an operation mode in which a predetermined control program is executed by receiving supply of a predetermined operation clock, and a stop mode that is stopped without receiving supply of the predetermined operation clock,
a user interface unit that detects a touch operation by a user and outputs an operation signal sequence corresponding to the detected touch operation, and
a command detection unit that detects a command corresponding to the touch operation on the basis of the output operation signal sequence,
in which, the command detection unit performs, in a case of having detected the command in a case where the processor module is in the stop mode, control so that the processor module shifts from the stop mode to the operation mode.

(2)
The electronic apparatus according to (1), in which the command detection unit detects times of and the number of times of the touch operations on the basis of the operation signal sequence, and includes a register that holds the detected times of and the detected number of times of the touch operations.

(3)
The electronic apparatus according to (1),
in which the command detection unit detects the one command on the basis of the operation signal sequence.

(4)
The electronic apparatus according to (3),
in which the command detection unit detects a breakpoint of the one command on the basis of a falling edge in the operation signal sequence, by which the command detection unit detects the command.

(5)
The electronic apparatus according to (4),
in which the command detection unit outputs a command detection signal to the processor module in a case where a predetermined time has elapsed from the falling edge.

(6)
The electronic apparatus according to (4),
in which the command detection unit outputs a timeout signal to the processor module in a case where a predetermined valid operation time has elapsed from a first rising edge in the operation signal sequence.

(7)
The electronic apparatus according to (1),
in which, in a case where the processor module is in the stop mode, the command detection unit receives power supply necessary for detection of the command.

(8)
The electronic apparatus according to (5), further including an activation unit,
in which, in a case of having received the command detection signal, the activation unit starts supply of the predetermined operation clock to the processor module, and shifts the processor module from the stop mode to the operation mode.

(9)
The electronic apparatus according to (6), further including an activation unit,
in which, in a case of having received the timeout signal, the activation unit starts supply of the predetermined operation clock to the processor module, and shifts the processor module from the stop mode to the operation mode.

(10)
The electronic apparatus according to (2),
in which, in a case of having shifted from the stop mode to the operation mode, the processor module refers to the register, and acquires the times of and the number of times of the touch operations, the times of and the number of times being held in the register.

(11)
The electronic apparatus according to (10),
in which the processor module transmits, to an external device, a command based on the times of and the number of times of the touch operations, the times of and the number of times being acquired from the register.

(12)
The electronic apparatus according to (1),
in which the touch operation includes a single or more tap operations, a long-press operation, a flick operation, and/or a 3D touch operation.

(13)
An electronic apparatus comprising a first device and a second device,
in which each of the first device and the second device includes
a processor module including an operation mode in which a predetermined control program is executed by receiving supply of a predetermined operation clock, and a stop mode that is stopped without receiving supply of the predetermined operation clock,
a user interface unit that detects a touch operation by a user and outputs an operation signal sequence corresponding to the detected touch operation, and
a command detection unit that detects a command corresponding to the touch operation on the basis of the output operation signal sequence,
each of the command detection units performs, in a case of having detected the command in a case where the processor module is in the stop mode, control so that the processor module shifts from the stop mode to the operation mode,
each of the processor modules transmits, in the operation mode, the detected command to an external device, and
each of the first device and the second device
operates under control of the external device according to a combination of the operation signal sequence from each of the user interface units.

(14)
A method for controlling operation of an electronic apparatus, the method including,
in a case where a processor module is in a stop mode in which the processor module stops without receiving supply of a predetermined operation clock,
receiving an operation signal sequence corresponding to a touch operation by a user, the touch operation being detected by a user interface unit,
detecting a command corresponding to the touch operation on the basis of the received operation signal sequence, and
in a case where the command is detected, performing control so that the processor module shifts from the stop mode to an operation mode in which a predetermined control program is executed by receiving supply of the predetermined operation clock.

REFERENCE SIGNS LIST

1 Electronic apparatus
1A First device
1B Second device
10 Housing
10a Housing surface
21 Power supply unit
22 User interface unit
221 Touch sensor
23 Command detection unit
231 Register
232 Edge detection unit
2321 Rising edge detection unit
2322 Falling edge detection unit
233 Operation time measurement unit
234 Operation count unit
235 Command breakpoint detection unit
236 Timeout detection unit
237 Output control unit
238 Operation signal strength determination unit
24 Processor module
241 CPU
242 Memory
25 Communication module
MD Master device

The invention claimed is:

1. An electronic apparatus, comprising:
a memory configured to store a specific control program;
a processor module including an operation mode in which the processor module is configured to execute the specific control program by reception of a supply of a specific operation clock, and a stop mode in which the processor module is configured to stop the execution of the specific control program without the reception of the supply of the specific operation clock;
a user interface unit configured to detect a user touch operation of user touch operations and output an operation signal sequence corresponding to the detected user touch operation; and
a command detection unit configured to:
detect, in the stop mode of the processor module, a command corresponding to the user touch operation based on the operation signal sequence;
control, based on the detected command, the processor module to shift from the stop mode to the operation mode; and
detect a time of each user touch operation of the user touch operations and a number of times of the user touch operations based on the operation signal sequence, wherein the command detection unit includes a register configured to hold the detected time of each user touch operation of the user touch operations and the detected number of times of the user touch operations.

2. The electronic apparatus according to claim 1, wherein the command detection unit is further configured to detect one command based on the operation signal sequence.

3. The electronic apparatus according to claim 2, wherein the command detection unit is further configured to:
detect a breakpoint of the one command based on a falling edge in the operation signal sequence; and
detect the one command based on the falling edge.

4. The electronic apparatus according to claim 3, wherein the command detection unit is further configured to output a command detection signal to the processor module based on an elapse of a specific time from the falling edge.

5. The electronic apparatus according to claim 3, wherein the command detection unit is further configured to output a timeout signal to the processor module based on an elapse of a specific valid operation time from a rising edge in the operation signal sequence.

6. The electronic apparatus according to claim 1, wherein the command detection unit is further configured to receive, in the stop mode of the processor module, power supply necessary for the detection of the command.

7. The electronic apparatus according to claim 4, further comprising an activation unit configured to:
start the supply of the specific operation clock to the processor module, based on the output of the command detection signal to the processor module; and
shift the processor module from the stop mode to the operation mode.

8. The electronic apparatus according to claim 5, further comprising an activation unit configured to:
start the supply of the specific operation clock to the processor module, based on the output of the timeout signal to the processor module; and
shift the processor module from the stop mode to the operation mode.

9. The electronic apparatus according to claim 1, wherein the processor module is further configured to acquire, from the register, the time of each user touch operation of the user touch operations and the number of times of the user touch operations.

10. The electronic apparatus according to claim 9, wherein the processor module is further configured to transmit, to an external device, a specific command based on the time of each user touch operation of the user touch operations and the number of times of the user touch operations.

11. The electronic apparatus according to claim 1, wherein the user touch operation includes at least one of a single or more tap operations, a long-press operation, a flick operation, or a 3D touch operation.

12. An electronic apparatus, comprising:
a memory configured to store a specific control program; and
a first device and a second device, wherein each of the first device and the second device includes:
a processor module including an operation mode in which the processor module is configured to execute the specific control program by reception of a supply of a specific operation clock, and a stop mode in which the processor module is configured to stop the execution of the specific control program without the reception of the supply of the specific operation clock;
a user interface unit configured to detect a user touch operation of user touch operations and output an operation signal sequence corresponding to the detected user touch operation; and
a command detection unit configured to:
detect, in the stop mode of the processor module, a command corresponding to the user touch operation based on the output operation signal sequence;
control, based on the detected command, the processor module to shift from the stop mode to the operation mode; and
to detect a time of each user touch operation of the user touch operations and a number of times of the user touch operations based on the operation signal sequence, wherein
the command detection unit includes a register configured to hold the detected time of each user touch operation of the user touch operations and the detected number of times of the user touch operations,
the processor module is further configured to transmit, in the operation mode, the detected command to an external device, and
each of the first device and the second device is configured to operate under control of the external device based on the operation signal sequence from the user interface unit of each of the first device and the second device.

13. A method comprising:
in an electronic apparatus including a command detection unit, a user interface unit, a processor module, and a memory that stores a specific control program:
detecting, by the user interface unit, a user touch operation of user touch operations;
outputting, by the user interface unit, an operation signal sequence corresponding to the detected user touch operation;
detecting, by the command detection unit, in a stop mode of the processor module, a command corresponding to the user touch operation based on the operation signal sequence, wherein in the stop mode, the processor module stops execution of the specific control program without receiving a supply of a specific operation clock;

controlling, by the command detection unit, based on the detected command, the processor module to shift from the stop mode to an operation mode in which the processor module executes the specific control program by receiving the supply of the specific operation clock;

detecting, by the command detection unit, a time of each user touch operation of the user touch operations and a number of times of the user touch operations based on the operation signal sequence; and holding, in a register of the command detection unit, the detected time of each user touch operation of the user touch operations and the detected number of times of the user touch operations.

* * * * *